United States Patent
Takeuchi et al.

(10) Patent No.: US 10,189,585 B2
(45) Date of Patent: Jan. 29, 2019

(12) United States Patent

(54) SPACE FLIGHT SIMULATOR, PLANETARIUM HAVING THE SAME, AND SPACE FLIGHT SIMULATING PROGRAM

(71) Applicant: Konica Minolta Planetarium Co., Ltd., Toshima-ku, Tokyo (JP)

(72) Inventors: Kazuhiro Takeuchi, Toyokawa (JP); Nobuhiro Ishimaki, Shizuoka (JP); Kenichi Ootani, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 95 days.

(21) Appl. No.: 15/612,351

(22) Filed: Jun. 2, 2017

(65) Prior Publication Data

US 2017/0353657 A1 Dec. 7, 2017

(30) Foreign Application Priority Data

Jun. 3, 2016 (JP) .................................. 2016-112213

(51) Int. Cl.
| | |
|---|---|
| *H04N 5/232* | (2006.01) |
| *B64G 7/00* | (2006.01) |
| *G09B 27/00* | (2006.01) |
| *H04N 9/31* | (2006.01) |
| *G09B 9/30* | (2006.01) |
| *G09B 27/02* | (2006.01) |

(52) U.S. Cl.
CPC ................. *B64G 7/00* (2013.01); *G09B 9/30* (2013.01); *G09B 27/00* (2013.01); *G09B 27/02* (2013.01); *H04N 9/3179* (2013.01)

(58) Field of Classification Search
CPC . B46G 7/00; G09B 9/30; G09B 27/00; G09B 27/02; H04N 9/3179

USPC .......................................................... 348/39
See application file for complete search history.

(56) References Cited

U.S. PATENT DOCUMENTS

| | | | | | |
|---|---|---|---|---|---|
| 3,565,520 | A | * | 2/1971 | Raff et al. .............. | G03B 35/00 352/43 |
| 8,066,379 | B2 | * | 11/2011 | Lalley .................... | G03B 21/56 345/32 |
| 2001/0010537 | A1 | * | 8/2001 | Lang ...................... | G02B 26/10 348/36 |

FOREIGN PATENT DOCUMENTS

JP  2004-361584 A  12/2004

* cited by examiner

*Primary Examiner* — Hee-Yong Kim
(74) *Attorney, Agent, or Firm* — Buchanan Ingersoll & Rooney PC

(57) ABSTRACT

A space flight simulator includes: a celestial-body-position output unit configured to output three-dimensional positions of extragalactic celestial bodies in space; an observation-position designation unit configured to allow an operator to designate a three-dimensional position and a posture of an observer in extragalactic space; a celestial-body-image arrangement unit configured to determine, based on the output from the celestial-body-position output unit, arrangement of an image of each extragalactic celestial body in a star field seen from the designated three-dimensional position and posture of the observer, and generate a star field image; a cosmic-expansion selection unit configured to allow the operator to perform selection as to whether a cosmic expansion effect is taken into account; a time designation unit configured to designate an observation time; and a cosmic-expansion correction unit configured to correct the three-dimensional position of each extragalactic celestial body based on the cosmic expansion effect and the designated observation time.

6 Claims, 8 Drawing Sheets

SPACE FLIGHT SIMULATOR, PLANETARIUM HAVING THE SAME, AND SPACE FLIGHT SIMULATING PROGRAM

The entire disclosure of Japanese Patent Application No. 2016-112213 filed on Jun. 3, 2016 including description, claims, drawings, and abstract are incorporated herein by reference in its entirety.

BACKGROUND OF THE INVENTION

Field of the Invention

The present invention relates to a space flight simulator which simulates an image of a star field seen from an observation point in space far from the earth and generates the image. The present invention can be applied to a planetarium including the space flight simulator and a space flight simulating program.

Description of the Related Art

There have been planetarium projectors or astronomical simulators which can project electronic images and direct a pseudo-space flight. A pseudo-space flight is a simulation function in which, for example, a star field seen in space which is about tens of thousand light-years or farther away from the earth is projected. As an example of such a conventional planetarium, JP 2004-361584 A can be referred to. The planetarium in JP 2004-361584 A directs a pseudo-space flight by performing present position movement processing (see paragraphs [0025] and [0026], and FIG. 8 of JP 2004-361584 A). In order to direct such a pseudo-space flight, information on three-dimensional positions of celestial bodies in space is needed. The three-dimensional positions of celestial bodies are known from past observation data, and the information based on the data is used.

However, such a conventional technique described above has the following problem. If the distance scale of a space flight to be directed is expanded outside the Galaxy, the influence of the cosmic expansion cannot be ignored. Nevertheless, past observation data on the three-dimensional positions of extragalactic celestial bodies has been used. Meanwhile, the distances of the extragalactic celestial bodies from the earth are more than millions of light-years. Thus, the three-dimensional positions of the extragalactic celestial bodies used as given information are more than millions of years ago. This means that the present positions of the extragalactic celestial bodies are farther away from the positions of the given information by the cosmic expansion. Accordingly, if a space flight in an extragalactic scale is directed, the present three-dimensional positions of extragalactic celestial bodies are not reflected in the conventional technique.

SUMMARY OF THE INVENTION

The present invention is made to solve the problem of the above conventional technique. In other words, an object of the present invention is to provide a space flight simulator which can simulate a star field corresponding to the present three-dimensional positions of extragalactic celestial bodies based on the cosmic expansion effect when a space flight in an extragalactic distance scale is directed. Furthermore, another object of the present invention is to provide a planetarium including the space flight simulator and a space flight simulating program.

To achieve at least one of the abovementioned objects, according to an aspect, a space flight simulator reflecting one aspect of the present invention comprises: a celestial-body-position output unit configured to output three-dimensional positions of extragalactic celestial bodies in space; an observation-position designation unit configured to allow an operator to designate a three-dimensional position and a posture of an observer in extragalactic space; a celestial-body-image arrangement unit configured to determine, based on the output from the celestial-body-position output unit, arrangement of an image of each extragalactic celestial body in a star field seen from the designated three-dimensional position and posture of the observer, and generate a star field image; a cosmic-expansion selection unit configured to allow the operator to perform selection as to whether a cosmic expansion effect is taken into account; a time designation unit configured to designate an observation time; and a cosmic-expansion correction unit configured to correct the three-dimensional position of each extragalactic celestial body based on the cosmic expansion effect and the designated observation time, wherein the celestial-body-image arrangement unit is configured to determine the arrangement of the image of each extragalactic celestial body based on the three-dimensional position of each extragalactic celestial body after the correction by the cosmic-expansion correction unit when the cosmic expansion effect is taken into account, or determine the arrangement of the image of each extragalactic celestial body based on the three-dimensional position of each extragalactic celestial body before the correction by the cosmic-expansion correction unit when the cosmic expansion effect is not taken into account.

In a space flight simulator in the above aspect, the three-dimensional position and posture of an observer in extragalactic space can be designated. Thus, it is possible to generate a star field image seen from the designated observation point. This is a space flight simulation. In the space flight simulation, a star field image seen from a designated three-dimensional position (observation point) and posture of an observer is generated. In other words, the arrangement of the image of each extragalactic celestial body in the star field seen from the observation point is determined based on the three-dimensional position of each extragalactic celestial body acquired from a celestial-body-position output unit. Thus, a star field image is rendered. Here, an operator can perform selection as to whether the cosmic expansion effect is taken into account. Furthermore, an observation time is designated. When the cosmic expansion effect is taken into account, the three-dimensional position of each extragalactic celestial body is corrected based on the cosmic expansion effect. The star field image rendered based on the three-dimensional position after the correction is the star field image in which the cosmic expansion effect is taken into account. The designation of the observation time can be fixed to the present, or the designation by the operator can be accepted.

According to the space flight simulator of the aspect, the cosmic-expansion selection unit is preferably further configured to allow the operator to adjust at least a value of either a cosmological parameter or a redshift of a target extragalactic celestial body when the cosmic expansion effect is taken into account, and the celestial-body-image arrangement unit is preferably configured to use: an adjusted value of the cosmological parameter when the cosmological parameter is adjusted to take the cosmic expansion effect into account, or a prepared default value of the cosmological parameter when the cosmological parameter is not adjusted, and an adjusted value of the redshift of the target extragalactic celestial body when the redshift of the target extragalactic celestial body is adjusted to take the cosmic expansion effect into account, or a prepared default value of the redshift of the target extragalactic celestial body when the redshift of the target extragalactic celestial body is not adjusted. Accordingly, imaginary space can be directed.

To achieve at least one of the abovementioned objects, according to an aspect, a planetarium reflecting one aspect of the present invention comprises: a dome screen; the space flight simulator according to any of the aspects; and a projector configured to project the star field image generated by the celestial-body-image arrangement unit on the dome screen. Thus, it is possible to project, on a dome screen, a star field image in which the cosmic expansion effect is taken into account or a star field image in which the cosmic expansion effect is not taken into account in a space flight simulation.

According to the planetarium of the aspect, the celestial-body-image arrangement unit is preferably configured to switch and project, on the dome screen, a star field image in which the cosmic expansion effect is taken into account and a star field image in which the cosmic expansion effect is not taken into account in response to arbitrary switching, by the operator, of the selection as to whether the cosmic expansion effect is taken into account. Consequently, it is possible for the audience to visually feel the cosmic expansion effect in the space flight simulation.

According to the planetarium of the aspect, the planetarium preferably further comprises: a scheduling unit configured to store a schedule of programs to be shown on the dome screen and contain a switching script for changing the selection as to whether the cosmic expansion effect is taken into account in the schedule, wherein the celestial-body-image arrangement unit is preferably configured to switch and project, on the dome screen, a star field image in which the cosmic expansion effect is taken into account and a star field image in which the cosmic expansion effect is not taken into account in accordance with the switching script during a projection based on the schedule is performed. Thus, it is possible to automatically switch and project, on a dome screen, a star field image in which the cosmic expansion effect is taken into account and a star field image in which the cosmic expansion effect is not taken into account without switching operation by an operator each time.

To achieve at least one of the abovementioned objects, according to an aspect, a non-transitory recording medium storing a computer readable space flight simulating program reflecting one aspect of the present invention causes a space flight simulator to perform: a celestial-body-position acquisition process of acquiring three-dimensional positions of extragalactic celestial bodies in space; an observation-position designation process of allowing an operator to designate a three-dimensional position and a posture of an observer in extragalactic space; a celestial-body-image arrangement process of determining, based on the acquired three-dimensional position of each extragalactic celestial body, arrangement of an image of each extragalactic celestial body in a star field seen from the designated three-dimensional position and posture of the observer, and generating a star field image; a cosmic-expansion selection process of allowing the operator to perform selection as to whether a cosmic expansion effect is taken into account; a time designation process of designating an observation time; and a cosmic-expansion correction process of correcting the three-dimensional position of each extragalactic celestial body based on the cosmic expansion effect, wherein in the celestial-body-image arrangement process, the arrangement of the image of each extragalactic celestial body is determined based on the three-dimensional position of each extragalactic celestial body after the correction in the cosmic-expansion correction process when the cosmic expansion effect is taken into account, or the arrangement of the image of each extragalactic celestial body is determined based on the three-dimensional position of each extragalactic celestial body before the correction in the cosmic-expansion correction process when the cosmic expansion effect is not taken into account. Consequently, it is possible for an existing planetarium or space flight simulator to function as the one described in the above aspect.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
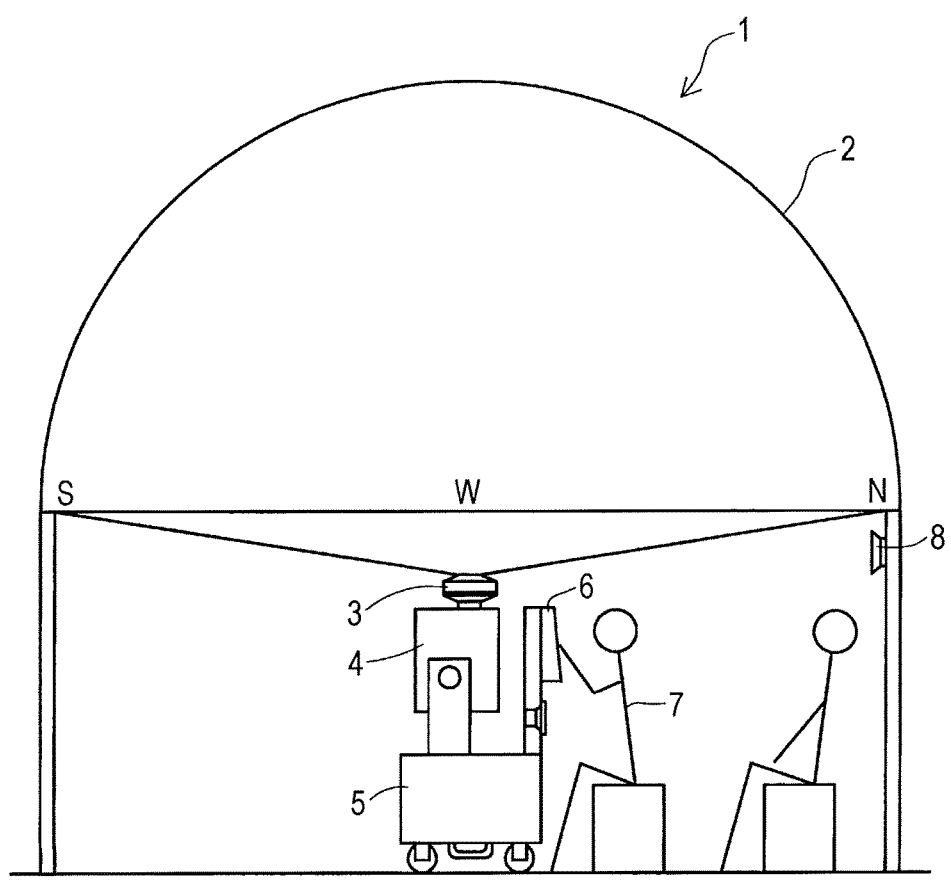
FIG. 1 is a cross-sectional view illustrating a configuration of a planetarium in an embodiment.

Hereinafter, an embodiment of the present invention will be described in detail with reference to the drawings. However, the scope of the invention is not limited to the illustrated examples. The present embodiment is an embodiment of the present invention as a planetarium 1 illustrated in FIG. 1. The planetarium 1 in FIG. 1 includes a dome screen 2, a projection lens 3, an image projection unit 4, an image control unit 5, an operation display unit 6, and a speaker 8.

The image control unit 5 controls a video image to be projected on the dome screen 2. The image control unit 5 in the present embodiment is a digital image control unit which basically generates an image by computer graphics. The image control unit 5 controls, in addition to an image, sounds to be output from the speaker 8 into the dome screen 2. The image projection unit 4 projects a video image generated by the image control unit 5 on the dome screen 2. The projection lens 3 is used for projecting the video image emitted from the image projection unit 4 on the entire dome screen 2. In this description, a fisheye lens is used as the projection lens 3. The operation display unit 6 is used by an operator 7 to operate the planetarium 1. Furthermore, the operation display unit 6 displays a screen for the operation to the operator 7.

Figure 2:
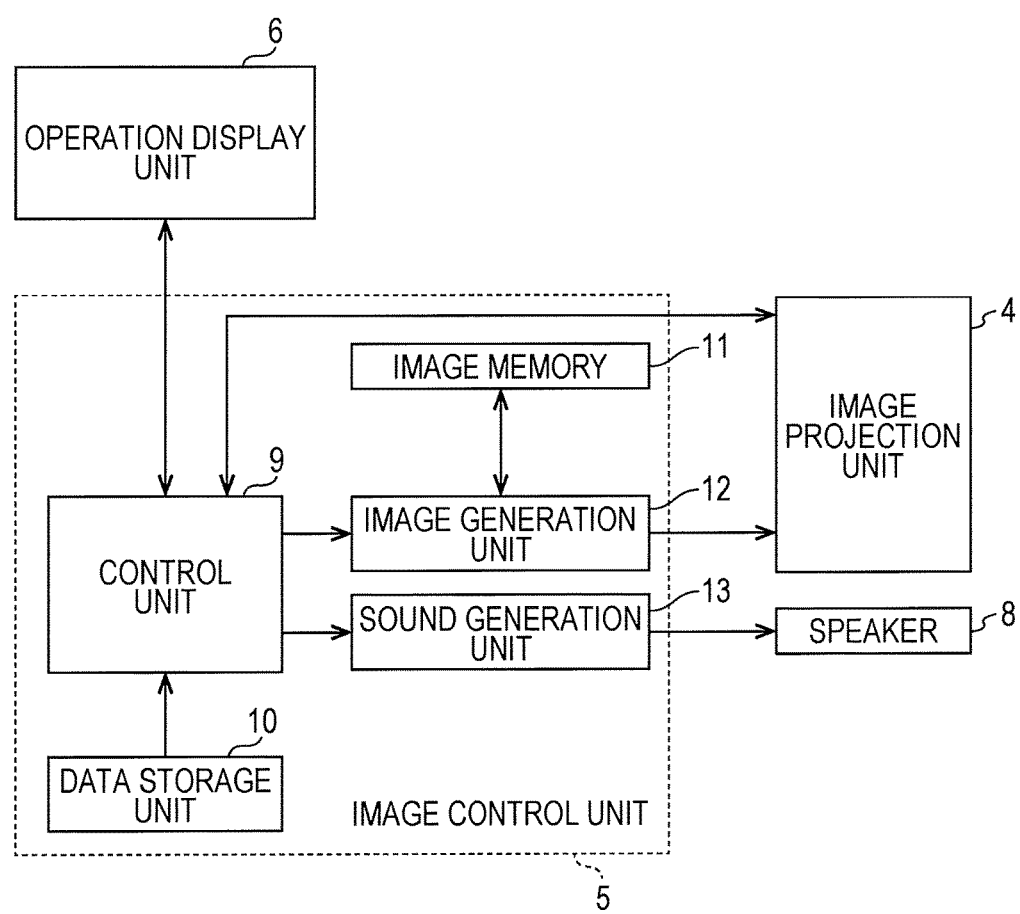
FIG. 2 is a block diagram illustrating a configuration of an image control unit.

The image control unit 5 is further described with reference to FIG. 2. As shown in FIG. 2, the image control unit 5 includes a control unit 9 as a core component. The image control unit 5 includes, in addition, a data storage unit 10, an image memory 11, an image generation unit 12, and a sound generation unit 13. The control unit 9 performs image control, sound control, illumination control, and the like according to the instruction input to the operation display unit 6 by the operator 7. In other words, the control unit 9 functions, as to be described later, as an observation-position designation unit, a celestial-body-image arrangement unit, a cosmic-expansion selection unit, a time designation unit, a cosmic-expansion correction unit, and a scheduling unit. The control unit 9 includes a space flight simulating program to function as the above units.

The data storage unit 10 stores data necessary for the control and files necessary for the projection or the like. The stored data includes, for example, the brightness and the three-dimensional position of each celestial body, and the redshift of each extragalactic celestial body. Furthermore, the stored files include, for example, photographic images and constellation illustrations of celestial bodies. The image generation unit 12 generates an image to be projected on the dome screen 2. The generated image is transmitted to the image projection unit 4, and projected through the projection lens 3 on the dome screen 2. Alternatively, the generated image may be stored in the image memory 11. The sound generation unit 13 generates sounds to be reproduced from the speaker 8.

The planetarium 1 in the present embodiment can perform a space flight simulation in addition to a normal projection of a star field image seen from the earth. In other words, by setting a place in space apart from the earth as an observation point, a star field image which will be seen from the place can be projected on the dome screen 2. In the planetarium 1 in the present embodiment, the observation point can be set especially to a distant extragalactic place in the space flight simulation. In this case, extragalactic celestial bodies mainly appear in the star field from the observation point.

Thus, the data storage unit 10 stores the three-dimensional positions and redshifts of main extragalactic celestial bodies as in, for example, the following examples (in practice, photographic images or the like are additionally included). Name of celestial body: Shapley supercluster, right ascension: 13 h 25 m, declination: −30°, distance: 652 million light-years, and redshift: 0.047

In the space flight simulation, it is necessary to designate the three-dimensional position and posture of an observer in space. The three-dimensional position of the observer is designated by three parameters of a right ascension, a declination, and a distance similarly to the three-dimensional position of a celestial body. In addition, the three-dimensional position of the observer may be designated by coordinate values in an orthogonal coordinate system or a cylindrical coordinate system. The posture of the observer is a direction in which the observer faces at the designated three-dimensional position. The posture is determined by three angle values. Normally, the posture is determined by three angle parameters of a yaw angle, a pitch angle, and a roll angle. In each angle parameter, the value of a standard posture which is suitably fixed is set as 0°, and the angle difference therefrom is used.

The three-dimensional position and posture of the observer are designated by the operator 7 through the operation display unit 6 using the six parameters in total (an observation-position designation process). Thus, a suitable input screen is displayed on the operation display unit 6 in order for the operator 7 to designate the parameters. The operator may directly input numerical values of the parameters on the input screen, or intuitively designate the position and posture using some graphics. In the latter case, the operator 7 who does not have the expertise can easily designate the position and posture.

When the three-dimensional position of the observer (observation point) is designated, using the three-dimensional position of each celestial body output from the data storage unit 10 (a celestial-body-position acquisition process), the arrangement of each celestial body in the star field from the observation point can be calculated. Then, by placing the image of the corresponding celestial body on the calculated arrangement position, the star field image from the observation point can be rendered (a celestial-body-image arrangement process). Note that, when the arrangement of each celestial body is calculated, the size of each celestial body in the star field from the observation point can be also calculated. This is because that the distance from the observation point to the three-dimensional position of each celestial body can be calculated. Thus, the image to be placed when the star field image is rendered is scaled down according to the size of the calculated corresponding celestial body.

The image of a necessary celestial body is prepared in the data storage unit 10. Furthermore, by designating the observation point, the distance between the observation point and the corresponding celestial body can be also calculated. The image of the celestial body to be placed is appropriately scaled down according to the distance. Then, the acquired star field image is appropriately rotated according to the designated posture of the observer. The star field image to be projected on the dome screen 2 is generated in this manner.

Figure 3:
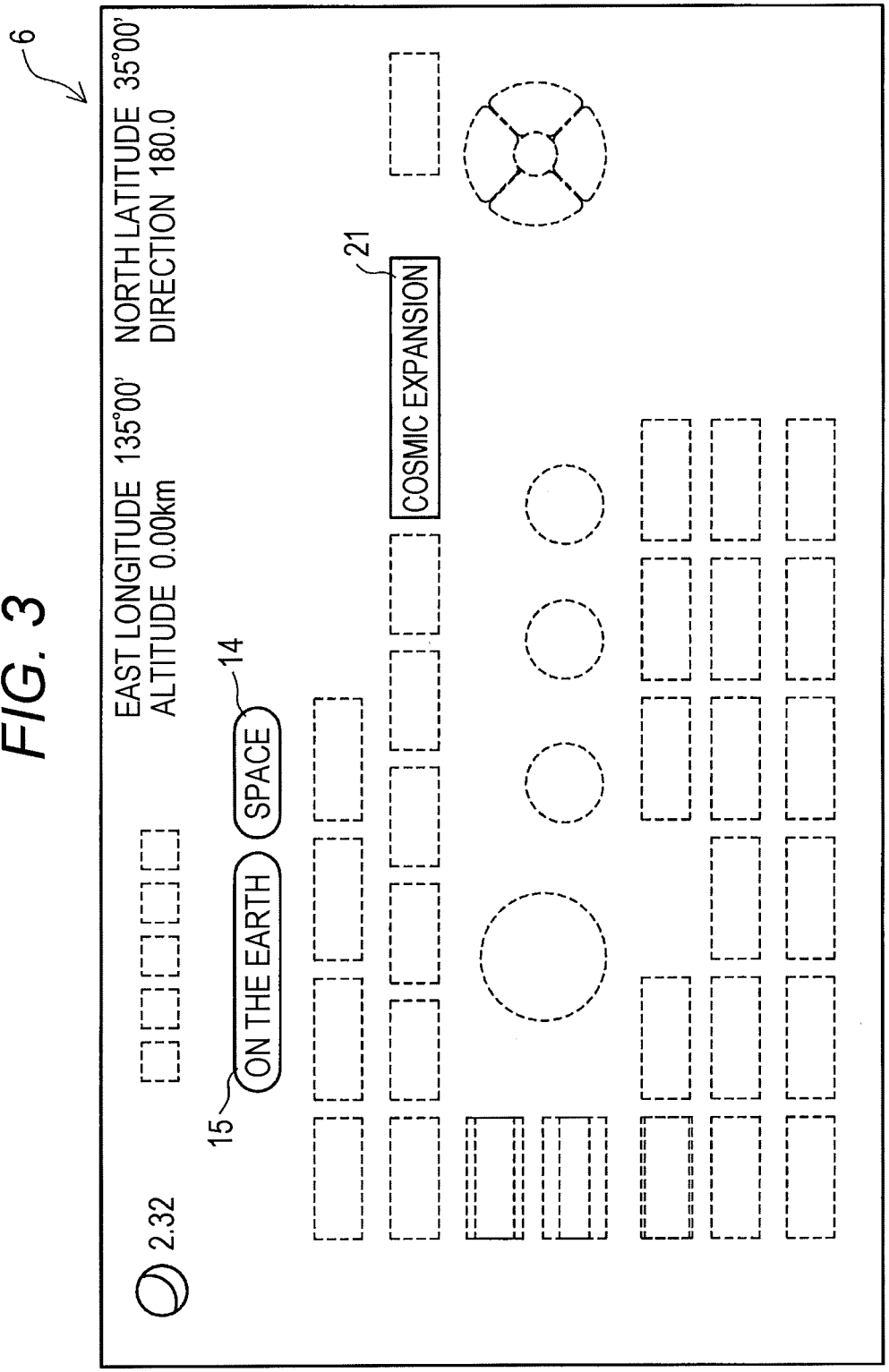
FIG. 3 is an elevational view illustrating an operation screen of an operation display unit.

The space flight simulation is started by pushing a space button 14 in an operation screen of the operation display unit 6 (FIG. 3). When the space button 14 is pushed, the input screen for inputting the parameters for the position and posture is displayed. Then, when the necessary parameters are designated, and the star field image as the space flight simulation is projected. Note that, when an on-the-earth button 15 is pushed instead of the space button 14 in the operation screen in FIG. 3, a star field image normally seen from the earth is projected after the necessary parameter setting. In addition, a cosmic expansion button 21 to be described later is displayed in the operation screen in FIG. 3.

Figure 4:
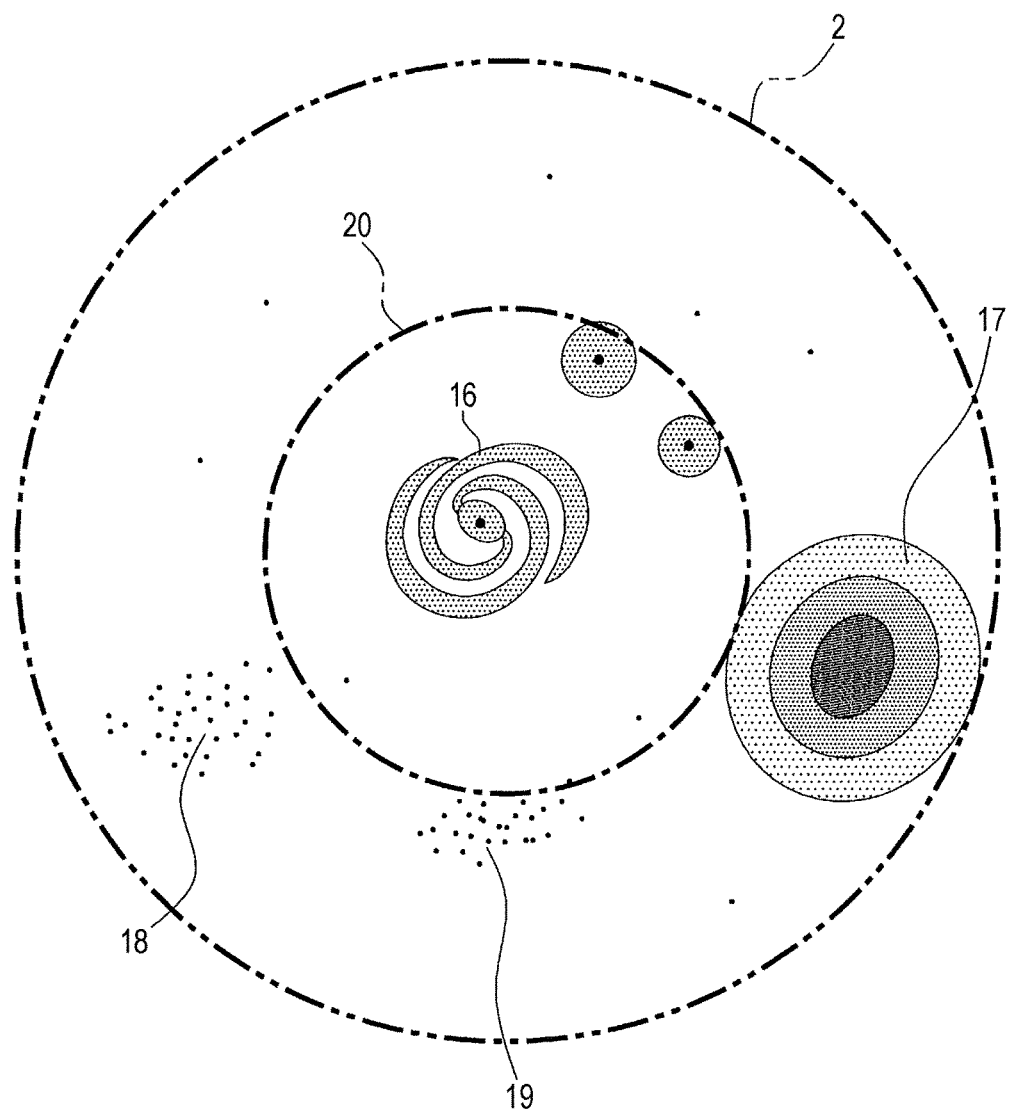
FIG. 4 is a diagram illustrating an example of a projected star field image in a space flight simulation.

In the space flight simulation, a star field image illustrated in, for example, FIG. 4 is projected on the dome screen 2. FIG. 4 illustrates a star field image when an observer is in a posture in which the observer nearly looks back at the earth by setting the observation point to an extragalactic distant place using the above angle parameter setting. For this reason, the image of a Milky Way galaxy 16 is arranged in the vicinity of the center of FIG. 4. The images of clusters of galaxies 17 to 19 are arranged around the Milky Way galaxy 16. The other dots in FIG. 4 are not fixed stars but extragalactic celestial bodies. A circle 20 in FIG. 4 is a virtual circle expressing the outer edge of a sphere with a radius of 200 thousand light-years centering the earth when seen from the observation point. This is a measure of a sense of distance in the star field for the audience. However, the circle 20 does not indicate that the cluster of galaxies 17 in FIG. 4 is about more than 200 thousand light-years away from the earth. This is because that each celestial body is three-dimensionally arranged in space. By moving the observation point and changing the posture while such a star field image is projected, it is possible for the audience to feel as if they are space-traveling. Note that, the circle 20 is not necessarily included in the star field image to be projected.

In the above description, actually, the cosmic expansion is not taken into account with respect to the three-dimensional positions of the main celestial bodies which are stored in the data storage unit 10 in advance. Thus, especially the present positions of distant extragalactic celestial bodies have actually farther distances. For this reason, in the planetarium 1 in the present embodiment, cosmic expansion correction is performed at the time of a space flight simulation.

Figure 5:
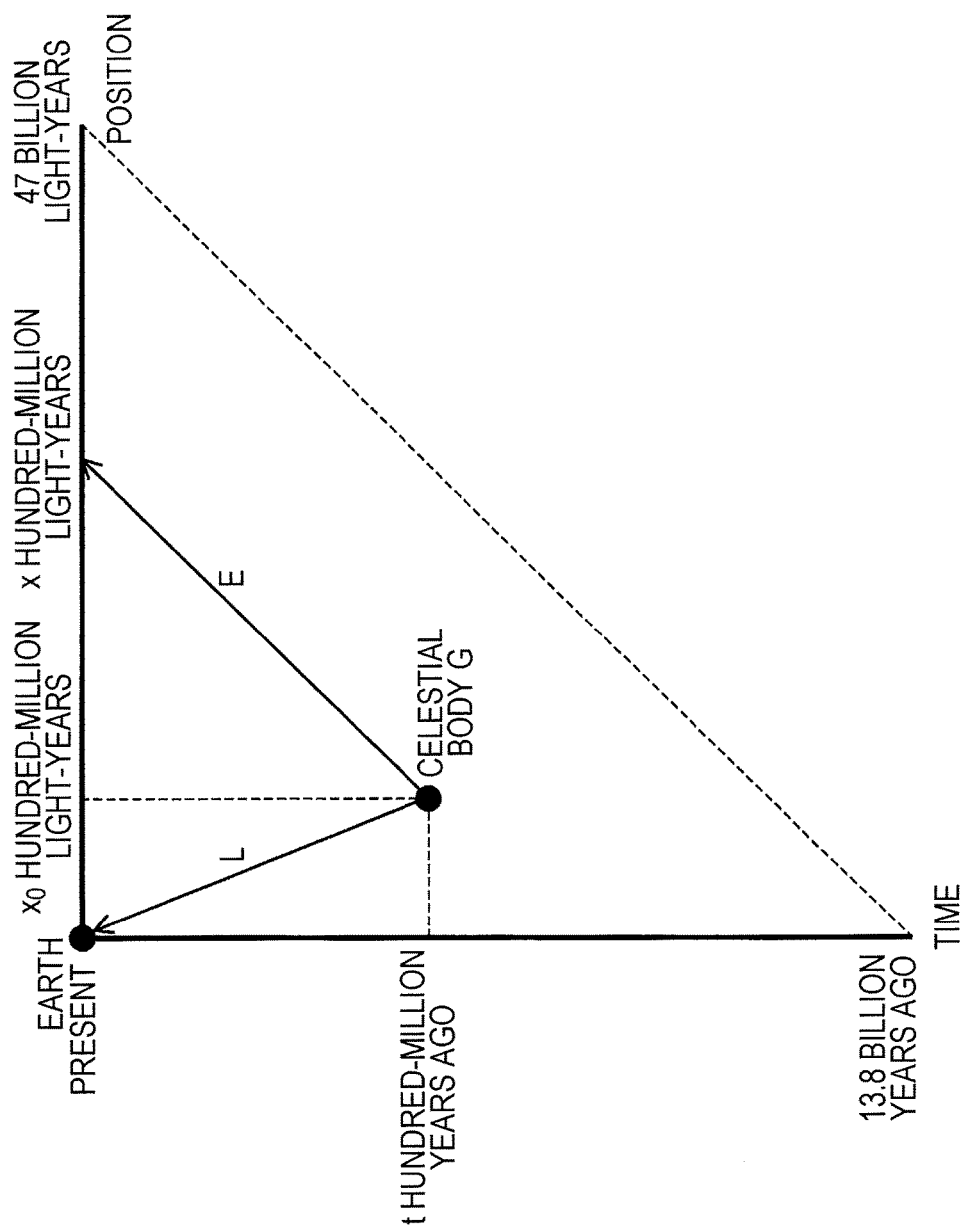
FIG. 5 is a schematic diagram of cosmic expansion correction.

FIG. 5 illustrates a schematic diagram of the cosmic expansion correction. In FIG. 5, the vertical axis indicates the time of 13.8 billion years which is considered as the cosmic age, and the horizontal axis indicates the distance of 47 billion light-years which is considered as the farthest distance. Here, a celestial body G the observation distance of which from the earth is $x_0$ hundred-million light-years is explained. Actually, light L emitted from the celestial body G t hundred-million years ago reaches the earth at present ($t > x_0$ due to the cosmic expansion effect). Since the celestial body G moves like an arrow E in FIG. 5 due to the cosmic expansion, the celestial body G is supposed to be x hundred-million light-years away from the earth at present ($x > x_0$). Note that, since it has been reported that the cosmic expansion tends to accelerate and the like, the arrow E in FIG. 5 is not strictly a simple straight line. However, the arrow E is simplified and indicated by a straight line here.

The equation for cosmic expansion is expressed by Expressions (1) to (3) of Formula 1 (source: Publications of the Science Museum of Osaka, volume 20, pp. 61-63 (2010)). Each parameter in Expressions (1) to (3) of Formula 1 indicates as follows: c: light velocity ($2.9 \times 10^5$ km/second), z: redshift of light L, $H_0$: Hubble constant (velocity of cosmic expansion), $\Omega_0$: density parameter (ratio of real space mass density to cosmological critical density), and $\Omega\Lambda$: cosmological term (dark energy density).

[Formula 1]

$$x = \frac{c}{H_0} \int_0^z \frac{dz}{\sqrt{(1+z)^3 \Omega_0 + \Omega_\Lambda}} \quad (1)$$

$$t = \frac{1}{H_0} \int_0^z \frac{dz}{(1+z)\sqrt{(1+z)^3 \Omega_0 + \Omega_\Lambda}} \quad (2)$$

$$x_0 = \frac{x}{1+z} \quad (3)$$

In the four parameters, the lower three parameters are referred to as cosmological parameters. The cosmological parameters determine the whole space from the past to the future. Currently, from various observation results, the following values are probable for the cosmological parameters. $H_0$: 71 km/second/megaparsec, $\Omega_0$: 0.27, and $\Omega\Lambda$: 0.73.

Figure 6:
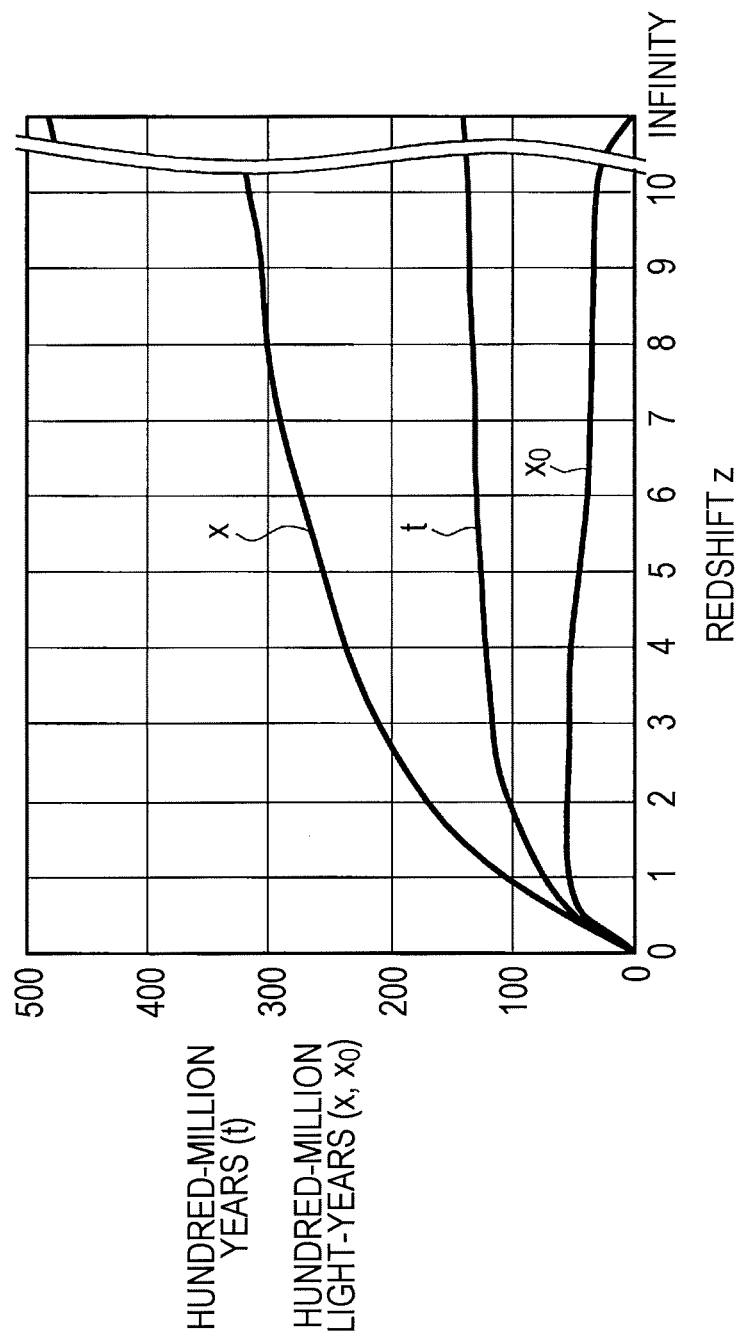
FIG. 6 is a graph showing x, t, and $x_0$ calculated with an equation for cosmic expansion.

On the other hand, the redshift z is a value of an absolute number determined by the spectrum of the light of each celestial body. Since the redshift z of each main extragalactic celestial body has been measured, all the parameters in Expressions (1) to (3) of Formula 1 are known. Thus, x, t, and $x_0$ in FIG. 5 for all the main extragalactic celestial bodies are determined by Expressions (1) to (3) of Formula 1. FIG. 6 is the graph of x, t, and $x_0$ determined in this manner (source: the same as the above). As the redshift z becomes larger, the difference between x and $x_0$ becomes larger. The value of $x_0$ is equivalent to the distance of the corresponding celestial body unless the cosmic expansion is taken into account. The distance of the three-dimensional position of each celestial body stored in the data storage unit 10 in advance is equivalent to the value of $x_0$.

In the planetarium 1 in the present embodiment, switching as to whether the cosmic expansion correction is performed can be performed by pushing the cosmic expansion button 21 in the operation screen in FIG. 3 at the time of the space flight simulation (a cosmic-expansion selection process). When the cosmic expansion correction is performed, the three-dimensional positions of the extragalactic celestial bodies are corrected (a cosmic-expansion correction process). In other words, the distance before the correction of the three-dimensional position of each celestial body stored in the data storage unit 10 in advance is replaced with x calculated by Expression (1) of Formula 1. Alternatively, x may be calculated by calculating backward Expression (3) of Formula 1 using the distance ($x_0$) before the correction of the three-dimensional position and the redshift z of the celestial body. Alternatively, x after the correction may be prepared in the data storage unit 10.

Figure 7:
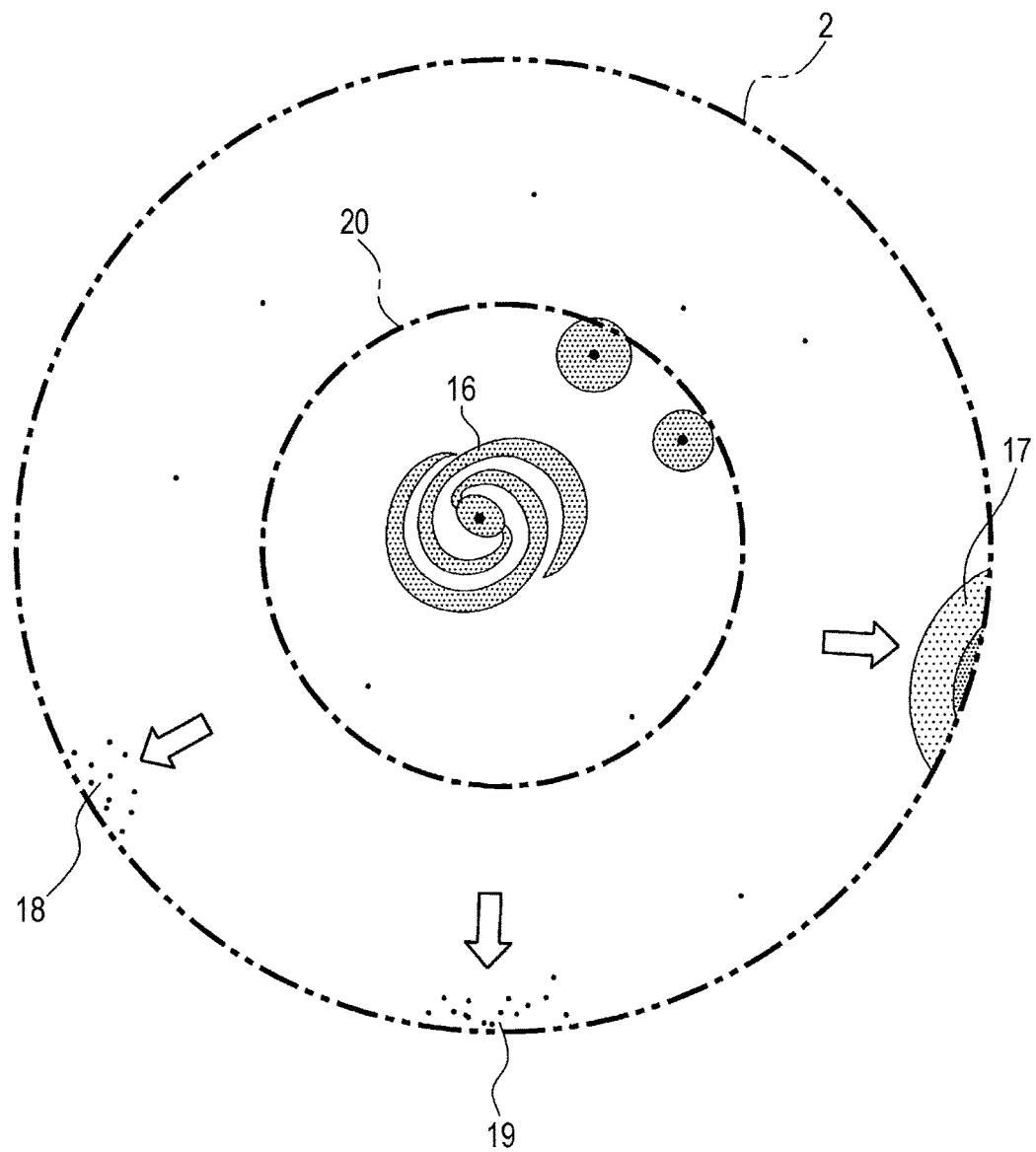
FIG. 7 is a diagram illustrating an example of a projected star field image after cosmic expansion correction.

Then, the arrangement of each celestial body in the star field image from the observation point is calculated again using the three-dimensional position after the correction of each celestial body. Next, the image of the corresponding celestial body is placed at the calculated arrangement position. Consequently, the star field image from the observation point in which the cosmic expansion is taken into account is obtained. FIG. 7 illustrates an example of a projected star field image in which the cosmic expansion is taken into account. The star field image in FIG. 7 is different from FIG. 4 in that the cosmic expansion is taken into account, and the three-dimensional position and posture of the observer is the same. In FIG. 7, the circle 20 which is a measure of a sense of distance is shown similarly to FIG. 4.

The comparison of FIG. 7 with FIG. 4 shows following points. The clusters of galaxies 17 to 19 in FIG. 7 are farther away from the Milky Way galaxy 16 than FIG. 4. The clusters of galaxies 17 to 19 are originally distant celestial bodies which are outside the circle 20 in FIG. 4. Such distant celestial bodies become farther in the case in which the cosmic expansion is taken into account than in the case in which the cosmic expansion is not taken into account. On the other hand, the positions of some celestial bodies inside the circle 20 in FIG. 7 do not differ much from FIG. 4. This is because that those celestial bodies constitute the cluster of galaxies (the Virgo cluster) which is relatively close to the Milky Way galaxy 16, and are not affected by the cosmic expansion due to the action of the gravity. Alternatively, if the celestial bodies are distant from the Milky Way galaxy 16, the angle difference between the celestial bodies and the Milky Way galaxy 16 in the visual line from the observation point is small, and the influence of the cosmic expansion hardly appears as the movement in the star field.

In the planetarium 1 in the present embodiment, every time the cosmic expansion button 21 in the operation screen in FIG. 3 is pushed, the projection image in FIG. 4 and the projection image in FIG. 7 can be switched. Consequently, the audience can visually fell the effect of the cosmic expansion.

Figure 8:
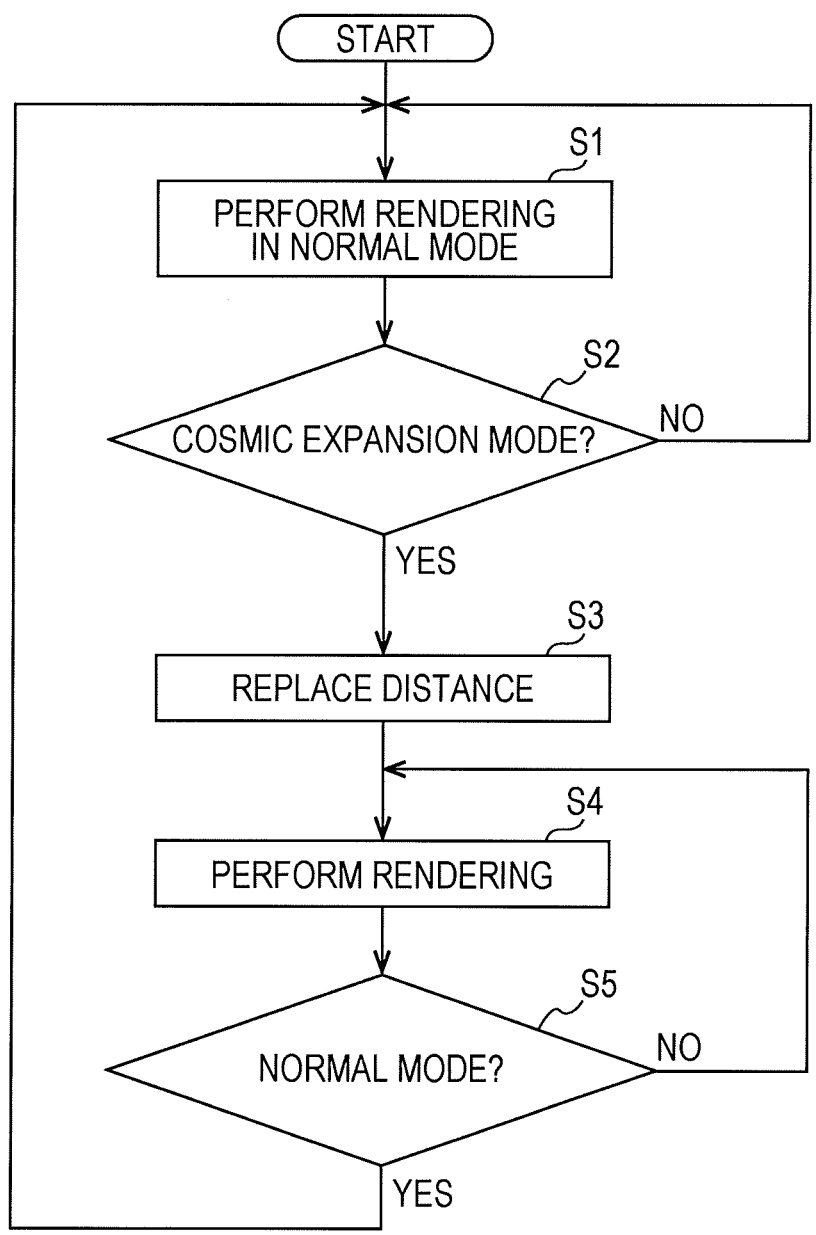
FIG. 8 is a flowchart when switching as to whether the cosmic expansion correction is performed.

FIG. 8 shows the flowchart when the projection image in FIG. 4 and the projection image in FIG. 7 are switched. In FIG. 8, it is assumed that the case in which the cosmic expansion is not taken into account is set as an initial setting of a space flight simulation. When a space flight simulation is started, first, rendering is performed in a normal mode (S1). That is, a star field image similar to FIG. 4 is projected on the dome screen 2. Thereafter, unless the mode is switched to a cosmic expansion mode (S2: No), this state is maintained. When the cosmic expansion button 21 in the operation screen is pushed, the mode is switched to the cosmic expansion mode (S2: Yes). Thus, the distances of celestial bodies are replaced (S3). In other words, the distance ($x_0$) before the correction of the three-dimensional position of each celestial body is replaced with the distance (x) after the correction. Thus, a star field image similar to FIG. 7 is projected on the dome screen 2 (S4).

Thereafter, unless the mode is switched to the normal mode (S5: No), this state is maintained. When the cosmic expansion button 21 is pushed again, the mode is switched to the normal mode (S5: Yes). Thus, the image to be projected on the dome screen 2 is switched to the image in FIG. 4 again (S1). The switching is repeated until the space flight simulation is ended. Note that, the images rendered in S1 and S4 may be stored in the image memory 11. In this case, it is not necessary to re-render the image every time the cosmic expansion button 21 is pushed thereafter.

Note that, the switching as to whether the cosmic expansion is taken into account depends on the operation of the operator 7 as described above, or may be automatically performed based on a schedule. In this case, a scheduling function is provided to the control unit 9, and a program timetable is stored in the data storage unit 10. Then, a switching script for changing the selection as to whether the cosmic expansion effect is taken into account is included in the timetable. Accordingly, during an automatic program based on the timetable is showing, the projection image in FIG. 4 and the projection image in FIG. 7 are automatically switched at every timing when the switching script is described.

In the above description, an observation time of the observer has not been described. This is based on the assumption that the observation time is the present. However, the planetarium 1 in the present embodiment may be configured so that the observation time is designated. This is because that the position of the celestial body G affected by the cosmic expansion is changed over time as indicated by the arrow E in FIG. 5. The observation time is designated by the operator 7 through the operation display unit 6 (a time designation process) similarly to the designation of the three-dimensional position and posture of the observer. The operator may directly input numerical values of several hundred-million years ago or several hundred-million years later, or may designate the observation time on the vertical axis of a diagram similar to FIG. 5 displayed in the screen of the operation display unit 6. Note that, by setting the observation time to the present as an initial setting, if the operator 7 omits the designation of the observation time, the observation time is the present. Furthermore, the planetarium 1 in the present embodiment may be configured so that the designation by the operator 7 is not accepted by fixing the observation time to the present.

When a time other than the present is designated as the observation time, the distance of each celestial body at the designated observation time is calculated. Then, rendering and projection is performed based on the calculated distance of each celestial body. The distance of each celestial body at a time other than the present may be calculated by the cosmic expansion equation based on the cosmology, or by a linear function by considering the arrow E in FIG. 5 as the linear function between the time and the distance. Furthermore, a function having a higher-order term considering the tendency to accelerate/decelerate the cosmic expansion (the tendency to accelerate according to the present observation) may be used. Naturally, a distance value for each observation time may be prepared. Note that, by changing the observation time while the three-dimensional position of the observer is fixed, it is possible to direct a time travel.

Furthermore, the adjustment of not only the observation time but also the cosmological parameter and the redshift by the operator may be accepted. The parameters are set to the above values based on the actual observation as default values. When the values are changed by the adjustment, the calculations are performed based on the adjusted values, and rendering and projection are performed. By rendering and projecting a star field image using values different from the actual values, it is possible to direct imaginary space. Note that, adjustment may be accepted by directly inputting numerical values or intuitively designating values using some graphics similarly to the designation of the three-dimensional position and posture of the observer. Furthermore, adjustment of not only all the cosmological parameter and the redshift but also a part of the parameters may be accepted.

Note that, a command for shifting a state in order for the operator 7 to designate an observation time and adjust various parameters is only required to be appropriately determined. For example, by keeping the cosmic expansion button 21 in the screen in FIG. 3 down, a shift button to a designation mode or an adjustment mode may appear in the screen.

As detailedly described above, according to the planetarium 1 in the present embodiment, a space flight simulation is performed by projecting, on the dome screen 2, a star field image seen from an observation point in extragalactic space far away from the earth. That is, the image control unit 5 of the planetarium 1 in the present embodiment is a space flight simulator. In this point, it is possible to project a star field image in which the cosmic expansion correction is performed based on the selection by the operator in the present embodiment. Furthermore, it is possible to easily perform switching as to whether the cosmic expansion correction is performed. Accordingly, it is possible to fabricate the planetarium 1 and the space flight simulator which can simulate a star field corresponding to the present three-dimensional positions of extragalactic celestial bodies based on the cosmic expansion effect when a space flight in an extragalactic distance scale is directed. Furthermore, it is possible to provide a space flight simulating program causing the image control unit 5 to function as such a space flight simulator.

Note that, the present embodiment is merely an example and does not particularly limit the present invention. Thus, the present invention can be variously improved or modified without departing from the scope. For example, FIG. 1 illustrates the aspect in which the seat and the operation display unit 6 for the operator 7 are installed inside the dome screen 2, but this configuration is not necessary. In an aspect, the operation display unit 6 may be installed in a separate room outside the dome screen 2 in order for the operator 7 to perform various settings and operations in the separate room. Furthermore, the present invention is not limited to the case in which the entire planetarium 1 including the dome screen 2 is newly established, and is applicable to the case in which the part of the image control unit 5 (optionally including the operation display unit 6 and the image projection unit 4) in the existing planetarium 1 is renewed. Moreover, the present invention is also applicable to the case in which a space flight simulating program is updated while the hardware of the image control unit 5 is maintained.

Accordingly, it is possible to distribute the space flight simulating program by storing it in some medium as a program product.

Although the present invention has been described and illustrated in detail, it is clearly understood that the same is by way of illustrated and example only and is not to be taken by way of limitation, the scope of the present invention being interpreted by terms of the appended claims.

What is claimed is:

1. Pi space flight simulator comprising:
a celestial-body-position output unit configured to output three-dimensional positions of extragalactic celestial bodies in space;
an observation-position designation unit configured to allow an operator to designate a three-dimensional position and a posture of an observer in extragalactic space;
a celestial-body-image arrangement unit configured to determine, based on the output from the celestial-body-position output unit, arrangement of an image of each extragalactic celestial body in a star field seen from the designated three-dimensional position and posture of the observer, and generate a star field image;
a cosmic-expansion selection unit configured to allow the operator to perform selection as to whether a cosmic expansion effect is taken into account;
a time designation unit configured to designate an observation time; and
a cosmic-expansion correction unit configured to correct the three-dimensional position of each extragalactic celestial body based on the cosmic expansion effect and the designated observation time, wherein
the celestial-body-image arrangement unit is configured to determine the arrangement of the image of each extragalactic celestial body based on the three-dimensional position of each extragalactic celestial body after the correction by the cosmic-expansion correction unit when the cosmic expansion effect is taken into account, or determine the arrangement of the image of each extragalactic celestial body based on the three-dimensional position of each extragalactic celestial body before the correction by the cosmic-expansion correction unit when the cosmic expansion effect is not taken into account.

2. The space flight simulator according to claim 1, wherein
the cosmic-expansion selection unit is further configured to allow the operator to adjust at least a value of either a cosmological parameter or a redshift of a target extragalactic celestial body when the cosmic expansion effect is taken into account, and
the celestial-body-image arrangement unit is configured to use:
an adjusted value of the cosmological parameter when the cosmological parameter is adjusted to take the cosmic expansion effect into account, or a prepared default value of the cosmological parameter when the cosmological parameter is not adjusted, and
an adjusted value of the redshift of the target extragalactic celestial body when the redshift of the target extragalactic celestial body is adjusted to take the cosmic expansion effect into account, or a prepared default value of the redshift of the target extragalactic celestial body when the redshift of the target extragalactic celestial body is not adjusted.

3. A planetarium comprising:
a dome screen;
the space flight simulator according to claim 1; and
a projector configured to project the star field image generated by the celestial-body-image arrangement unit on the dome screen.

4. The planetarium according to claim 3, wherein
the celestial-body-image arrangement unit is configured to switch and project, on the dome screen, a star field image in which the cosmic expansion effect is taken into account and a star field image in which the cosmic expansion effect is not taken into account in response to arbitrary switching, by the operator, of the selection as to whether the cosmic expansion effect is taken into account.

5. The planetarium according to claim 3, further comprising:
a scheduling unit configured to store a schedule of programs to be shown on the dome screen and contain a switching script for changing the selection as to whether the cosmic expansion effect is taken into account in the schedule, wherein
the celestial-body-image arrangement unit is configured to switch and project, on the dome screen, a star field image in which the cosmic expansion effect is taken into account and a star field image in which the cosmic expansion effect is not taken into account in accordance with the switching script during a projection based on the schedule is performed.

6. A non-transitory recording medium storing a computer readable space flight simulating program for causing a space flight simulator to perform:
a celestial-body-position acquisition process of acquiring three-dimensional positions of extragalactic celestial bodies in space;
an observation-position designation process of allowing an operator to designate a three-dimensional position and a posture of an observer in extragalactic space;
a celestial-body-image arrangement process of determining, based on the acquired three-dimensional position of each extragalactic celestial body, arrangement of an image of each extragalactic celestial body in a star field seen from the designated three-dimensional position and posture of the observer, and generating a star field image;
a cosmic-expansion selection process of allowing the operator to perform selection as to whether a cosmic expansion effect is taken into account;
a time designation process of designating an observation time; and
a cosmic-expansion correction process of correcting the three-dimensional position of each extragalactic celestial body based on the cosmic expansion effect, wherein
in the celestial-body-image arrangement process, the arrangement of the image of each extragalactic celestial body is determined based on the three-dimensional position of each extragalactic celestial body after the correction in the cosmic-expansion correction process when the cosmic expansion effect is taken into account, or the arrangement of the image of each extragalactic celestial body is determined based on the three-dimensional position of each extragalactic celestial body before the correction in the cosmic-expansion correction process when the cosmic expansion effect is not taken into account.

* * * * *